(12) United States Patent
Gardner et al.

(10) Patent No.: US 9,141,102 B2
(45) Date of Patent: Sep. 22, 2015

(54) METHOD AND SYSTEM FOR SCHEDULING APPLIANCE OPERATION DURING OFF-PEAK DEMAND PERIODS

(71) Applicant: General Electric Company, Schenectady, NY (US)

(72) Inventors: John Alexander Gardner, Louisville, KY (US); Khalid Jamal Mashal, Louisville, KY (US); Geoffrey Lee Ranard, Louisville, KY (US); Christopher Styn, Louisville, KY (US)

(73) Assignee: General Electric Company, Schenectady, NY (US)

( * ) Notice: Subject to any disclaimer, the term of this patent is extended or adjusted under 35 U.S.C. 154(b) by 383 days.

(21) Appl. No.: 13/706,895

(22) Filed: Dec. 6, 2012

(65) Prior Publication Data

US 2014/0163763 A1    Jun. 12, 2014

(51) Int. Cl.
  *G05B 19/042*    (2006.01)
(52) U.S. Cl.
  CPC .... *G05B 19/042* (2013.01); *G05B 2219/25387* (2013.01); *G05B 2219/2639* (2013.01)
(58) Field of Classification Search
  None
  See application file for complete search history.

(56) References Cited

U.S. PATENT DOCUMENTS

| | | | |
|---|---|---|---|
| 6,961,642 B2 | 11/2005 | Horst | |
| 7,110,832 B2 | 9/2006 | Ghent | |
| 7,340,509 B2 | 3/2008 | Daum et al. | |
| 2010/0089909 A1* | 4/2010 | Besore et al. | 219/720 |
| 2011/0098869 A1* | 4/2011 | Seo et al. | 700/296 |
| 2011/0208369 A1* | 8/2011 | Yang et al. | 700/296 |
| 2012/0095606 A1 | 4/2012 | Besore et al. | |
| 2012/0095609 A1 | 4/2012 | Wetzel et al. | |

OTHER PUBLICATIONS

A. Barbato, et al., "Forecasting the Usage of Household Appliances Through Power Meter Sensors for Demand Management in the Smart Grid," Dipartimento di Elettronica e Informazione, Politecnico di Milano, Italy, 6 pages.

* cited by examiner

*Primary Examiner* — Kenneth M Lo
*Assistant Examiner* — Geoffrey Wellman
(74) *Attorney, Agent, or Firm* — Dority & Manning, P.A.

(57) ABSTRACT

A method for scheduling an appliance operation is provided. The method includes receiving a plurality of signals. Each signal has an on-peak signal. Based upon the plurality of signals, a predicted on-peak time value is determined. The predicted on-peak time value can be used to determine when to execute an appliance operation in order to avoid operating the appliance during an on-peak time period.

15 Claims, 3 Drawing Sheets

METHOD AND SYSTEM FOR SCHEDULING APPLIANCE OPERATION DURING OFF-PEAK DEMAND PERIODS

FIELD OF THE INVENTION

This disclosure relates generally to energy management systems for appliances.

BACKGROUND OF THE INVENTION

Certain utility companies are experiencing a shortage of electrical generating capacity due to increasing customer demand for electricity. In particular, such utility companies can be unable to meet their customers' demand for electricity during peak demand hours. Increasing electrical generating capacity to meet the shortfall can be difficult due to increasing fuel prices. As a result, utility companies can be forced to buy electricity to meet their customers' demands. If peak demand hours can be reduced, then utility companies and their customers can realize a potential cost savings, and the peak load that the utility companies have to accommodate can also be lessened.

In order to reduce or discourage power usage during the peak demand hours, certain utility companies charge higher rates during peak demand hours. In particular, certain utility companies have instituted time of use metering and variable rates which include higher rates for energy usage during on-peak hours and lower rates for energy usage during off-peak hours. As a result, customers are provided with an incentive to use electricity at off-peak hours rather than on-peak hours.

To take advantage of the lower cost of electricity during off-peak hours, customers are generally required to operate power consuming devices manually during the off-peak hours. This can be undesirable because customers may not always be present in the home to operate the devices during off-peak hours. Further, customers may be required to manually track the current time to determine what hours are off-peak and on-peak.

Certain energy management systems include features for deactivating power consuming devices during the on-peak hours. Such energy management systems can determine when variable electricity-pricing schemes go into effect via schedules published by utility companies and inputted by customers or via signals sent by utility companies, e.g., over a wireless network or through a phone network, directly to the energy management systems. However, inputting schedules manually can be tedious and time consuming. Similarly, energy management systems relying upon utility company input to function properly can function improperly if the utility company fails to deliver the schedules as expected.

Accordingly, an energy management system with features for predicting on-peak hours and/or off-peak hours in order to reduce consumer's electric bills and also to reduce the load on generating plants during on-peak hours would be useful.

BRIEF DESCRIPTION OF THE INVENTION

The present subject matter provides a method for scheduling an appliance operation. The method includes receiving a plurality of signals. Each signal has an on-peak time value. Based upon the plurality of signals, a predicted on-peak time value is determined. The predicted on-peak time value can be used to determine when to execute an appliance operation in order to avoid operating the appliance during an on-peak time period. Additional aspects and advantages of the invention will be set forth in part in the following description, or may be apparent from the description, or may be learned through practice of the invention.

In a first exemplary embodiment, a method for scheduling an appliance operation in order to reduce appliance energy consumption during on-peak time periods is provided. The method includes receiving a plurality of signals. Each signal of the plurality of signals has an on-peak time value. The method also includes storing the plurality of signals in a memory, determining a predicted on-peak time value based upon the plurality of signals, establishing an operation to be performed by an appliance, and executing the operation of the appliance prior to or after the predicted on-peak time value.

In a second exemplary embodiment, an energy management system for an appliance is provided. The energy management system includes a memory for storing a plurality of signals, a user interface panel configured for establishing an operation to be performed by the appliance, and a controller in communication with the memory and the user interface panel. The controller is configured for determining a predicted on-peak time value based upon the plurality of signals and executing the operation of the appliance prior to or after the predicted on-peak time value.

In a third exemplary embodiment, a method for predicting an on-peak time value in order to reduce appliance energy consumption during on-peak time periods is provided. The method includes receiving a plurality of signals. Each signal of the plurality of signals has an on-peak time value. The method also includes storing the plurality of signals in a memory and determining a predicted on-peak time value based upon the plurality of signals.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
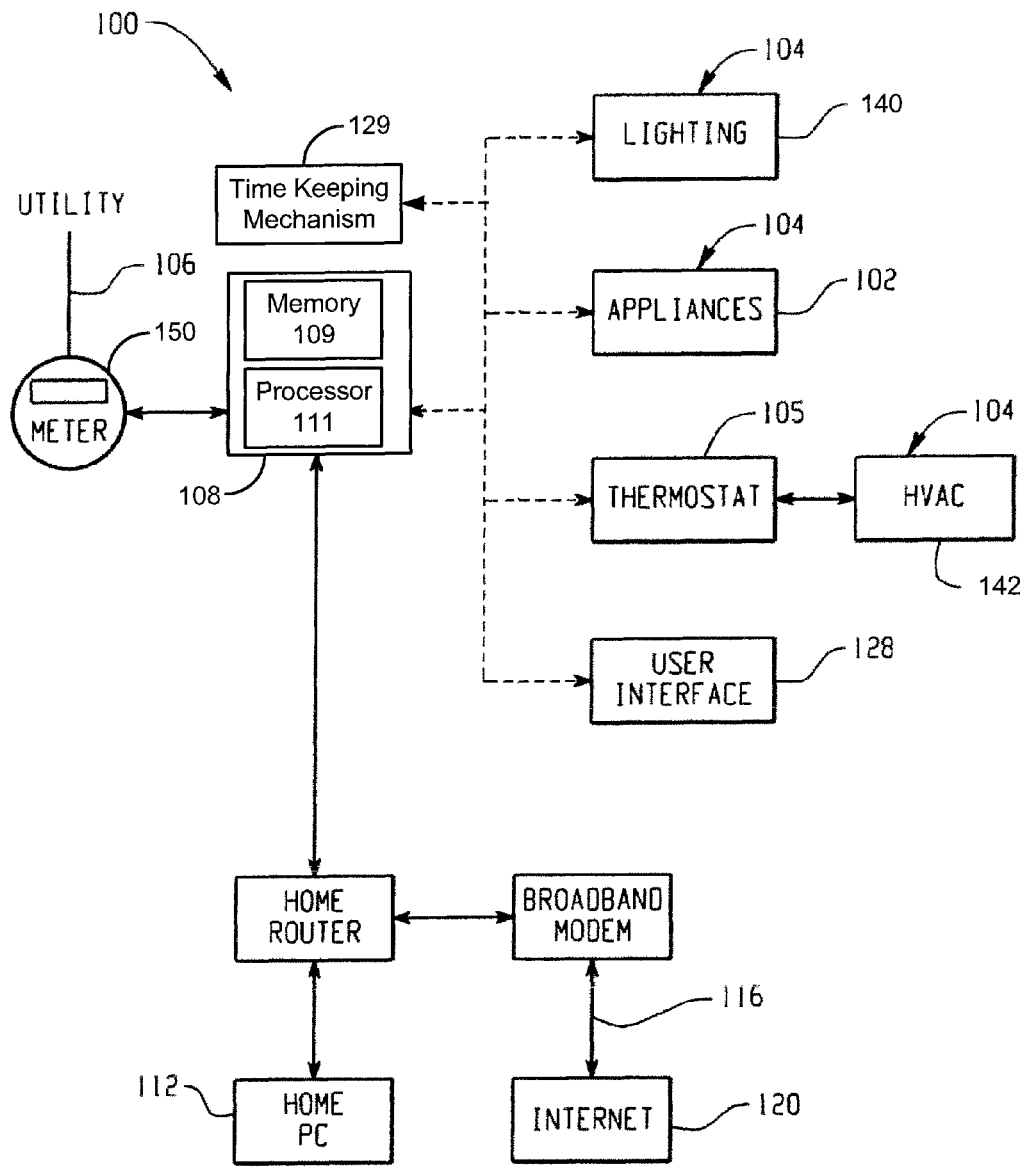
FIG. 1 provides a schematic view of an energy management system according to an exemplary embodiment of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations.

FIG. 1 provides a schematic view of an energy management system 100 according to an exemplary embodiment of the present subject matter. Energy management system 100 is configured for regulating a plurality of power consuming features/functions 104. Power consuming features/functions 104 include appliances 102, an HVAC system 142 having an internal or external thermostat 105, and lighting elements 140. It should be understood that power consuming features/functions 104 are not limited to the devices shown in FIG. 1 and that energy management system 100 can regulate additional power consuming features/functions 104 such as a residential sprinkler system. Appliances 102 may include any suitable type of appliance such as a dryer appliance, a washing machine appliance, a dishwasher appliance, an oven appliance, a water heater appliance, and/or a refrigerator appliance, et al. As discussed in greater detail below, energy management system 100 may be used to regulate and manage appliances 102, HVAC system 142, and lighting elements 140, e.g., in order to reduce household electricity costs and also to reduce the load on generating plants during peak hours of electricity usage.

Energy management system 100 is operatively associated with power consuming features/functions 104. In particular, energy management system 100 includes a controller 108 which is configured to selectively operate power consuming features/functions 104. For example, controller 108 can activate and deactivate power consuming features/functions 104. Controller 108 may be positioned at any suitable location. For example, controller 108 may be configured as a stand-alone unit positioned within a residence housing energy management system 100, or controller 108 may be integrated within one of power consuming features/functions 104 such as one of appliances 102.

Controller 108 includes a memory 109 and one or more processing devices 111 such as microprocessors, CPUs or the like, such as general or special purpose microprocessors operable to execute programming instructions or micro-control code associated with operation of power consuming features/functions 104. Memory 109 can represent random access memory such as DRAM, or read only memory such as ROM or FLASH. Processor 111 executes programming instructions stored in memory 109. Memory 109 can be a separate component from processor 111 or can be included onboard within processor 111 and can also include a storage device such as a hard disk drive or a magnetic tape. Alternatively, controller 108 may be constructed without using a microprocessor, e.g., using a combination of discrete analog and/or digital logic circuitry (such as switches, amplifiers, integrators, comparators, flip-flops, AND gates, and the like) to perform control functionality instead of relying upon software.

Energy management system 100 includes a user interface 128 for permitting a user to operate energy management system 100, e.g., power consuming features/functions 104. User interface 128 may be any type of interface such as a touch screen, knobs, sliders, buttons, speech recognition, etc., that permits a user to input control commands for energy management system 100. However, energy management system 100 need not include an independent user interface 128. Thus, user interface 128 may be incorporated within, e.g., a home computer 112 or one of appliances 102.

Energy management system 100 also includes a time keeping mechanism 129 that provides information to controller 108 and/or a user regarding the current time of the day. Time keeping mechanism 129 also includes a calendar function to provide information regarding the day of the week and the current date. A user can set time keeping mechanism 129 manually, or time keeping mechanism 129 can set automatically, e.g., via synchronization to an atomic clock radio signal.

As discussed above, energy management system 100 is configured for regulating power consuming features/functions 104. As will be understood by those skilled in the art, operations of power consuming features/functions 104 require electricity, e.g., supplied by an associated utility via a power meter 150. However, a cost of electricity supplied to operate power consuming features/functions 104 can vary based upon time of use sliding rate scales. Thus, power consuming features/functions 104 can operate in a more cost effective manner by planning operations such that power consuming features/functions 104 run during periods of relatively low electricity costs.

Energy management system 100 is configured to receive and process a schedule or signal 106 from a signal source, such as the associated utility or a utility cooperative. Thus, energy management system 100 is in communication with the signal source. In particular, controller 108 is configured to receive and process signal 106 from the signal source. As an example, the signal source may transmit signal 106 to power meter 150 located at the residence housing energy management system 100. The signal source may transmit signal 106 via any suitable transmission mechanism such as wireless, wired, ZigBee, Bluetooth, or radio frequency (RF) transmission mechanism. In turn, controller 108 can receive signal 106 from meter 150, e.g., via any of the transmission mechanisms described above. In alternative exemplary embodiments, controller 108 may receive signal 106 directly from the signal source, or signal 106 may be downloaded 116, e.g., from the internet 120 to a home computer 112 and subsequently transmitted from home computer 112 to controller 108.

As will be understood by those skilled in the art, signals 106 can include on-peak time information or values and off-peak time information or values. As used herein, the term "on-peak" is meant to encompass times or time periods that the signal source has designated as referring to times or time periods of high energy demand or cost. Conversely, the term "off-peak" meant to encompass times or time periods of low energy demand or cost. In various exemplary embodiments, the signal source may designate multiple demand or cost levels and thus on-peak is meant to refer to those times and time periods where the energy demand or cost is greater than some other times and time periods, with the other times and time periods being referred to as off-peak. Thus, in any given situation, on-peak may not be the absolute highest demand or cost level and off-peak may not be the absolute lowest demand or cost level.

Energy management system 100 utilizes signals 106 to regulate or control power consuming features/functions 104 such that operations of power consuming features/functions 104 can be performed during off-peak times. In particular, operations of power consuming features/functions 104 can be delayed, scheduled for certain times, and/or altered in their functioning/features in order to reduce operating costs.

Energy management system 100 can reduce operating costs of power consuming features/functions 104 by predicting off-peak time periods during which operations of power consuming features/functions 104 are relatively cheaper and running power consuming features/functions 104 during such predicted off-peak time periods. For example, to reduce operating costs, energy management system 100 can delay execution of a defrost operation of a refrigerator appliance or a heating operation of a water heater appliance based upon such predicted off-peak time periods. Similarly, energy management system 100 can delay execution of a wash operation of a dishwasher or washing machine appliance based upon such predicted off-peak time periods.

Figure 2:
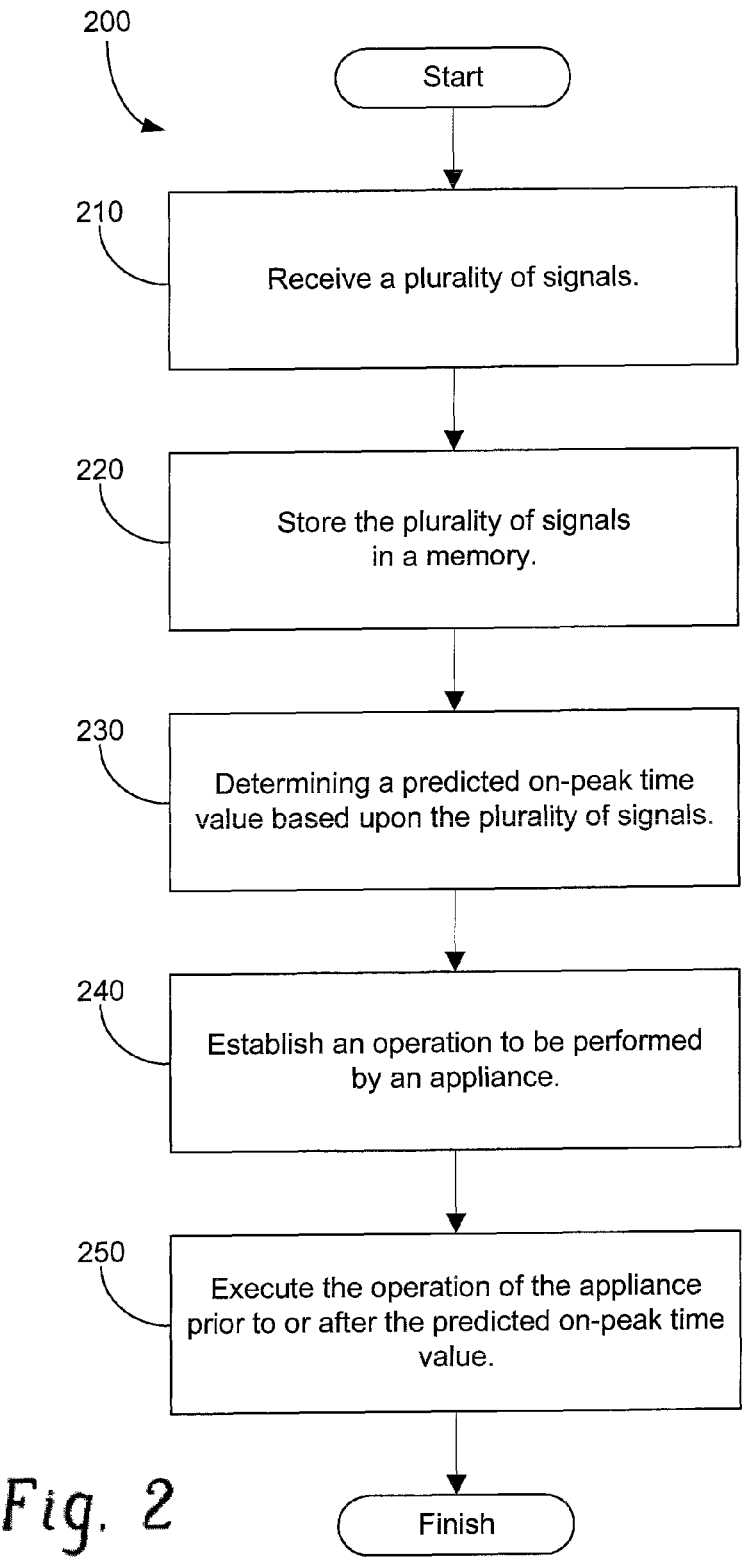
FIG. 2 illustrates a method for scheduling an appliance operation according to an exemplary embodiment of the present subject matter.

FIG. 2 illustrates a method 200 for scheduling an appliance operation, e.g., of appliances 102 (FIG. 1), according to an exemplary embodiment of the present subject matter. Energy management system 100, e.g., controller 108, (FIG. 1) may be configured or programmed to implement method 200. As discussed in greater detail below, utilizing method 200 can permit energy management system 100 to predict an on-peak time period in order to permit energy management system 100 to avoid operating power consuming features/functions 104 during on-peak time periods.

At step 210, energy management system 100, e.g., controller 108, receives a plurality of signals, e.g., signals 106. Each signal of the plurality of signals has an on-peak time value (e.g., at least one on-peak time value) or on-peak time information. Each signal of the plurality of signals can also include an off-peak time value (e.g., at least one off-peak time value) or off-peak time information. As an example, a utility company can send the plurality of signals to energy management system 100 at step 210 to inform their customer of a price change associated with the on-peak time value of the plurality of signals. During step 210, energy management system 100 can receive signals at any suitable rate. For example, energy management system 100 can receive a signal daily, weekly, or monthly so that, over a period of time, energy management system 100 accumulates the plurality of signals.

At step 210, energy management system 100 can also label each signal of the plurality of signals with at least one of a date and a time (e.g., from time keeping mechanism 129) corresponding to when each signal of the plurality of signals was received during step 210. Thus, energy management system 100 can determine when each on-peak signal was received by energy management system 100 during step 210.

At step 220, energy management system 100, e.g., controller 108, stores the plurality of signals in a memory, e.g., memory 109. Thus, after step 220, energy management system 100 can access memory 109 to determine a history of when on-peak signals are received from the utility company. In certain exemplary embodiments, energy management system 100 can receive the plurality of signals at one time and store the plurality of signals within memory 109 at such time. For example, a utility company can send their customers a schedule of signals for an entire month at one time. In alternative exemplary embodiments, energy management system 100 can receive the plurality of signals over a period of time and store each signal of the plurality of signals within memory 109 as each signal is received. For example, the utility company can send their customers a single signal each day.

At step 230, energy management system 100, e.g., controller 108, determines a predicted on-peak time value based upon the plurality of signals, e.g., using predictive analytics. Thus, e.g., controller 108 can analyze the plurality of signals stored within memory 109 to determine a trend for when on-peak signals are received by energy management system 100. As an example, the utility company could send a signal to energy management system 100 every day at four p.m. that indicates the current rate for power consuming features/functions 104 is on-peak and relatively expensive. Based upon such previously received signals, controller 108 can determine the predicted on-peak time value as four p.m. for subsequent days. In particular, controller 108 can average the date and/or the time of the plurality of signals to determine the predicted on-peak time value at step 230.

At step 240, an operation or action to be performed by an appliance is established. As an example, a user can utilize inputs on the appliance to request the appliance to begin the operation. In particular, the user could load a washing machine or a dishwasher appliance with articles for washing and utilize inputs on a control panel of the appliance to activate the appliance. Similarly, a refrigerator appliance could require a defrost operation in order to remove frost from an evaporator of the refrigerator appliance. At step 250, energy management system 100, e.g., controller 108, executes or initiates the operation of the appliance prior to or after the predicted on-peak time value.

As an example, the user may request the appliance to begin operating in close proximity to the predicted on-peak time value. Thus, despite not having received a signal from the utility company indicating the rates are within an on-peak time, operating the appliance at that particular time is likely to be relatively expensive because an on-peak signal is likely to be received within a short time. Accordingly, energy management system 100 can recommend to the user that initiation of the appliance operation be delayed. Alternatively, the user may program energy management system 100 to only operate the appliance before or after the predicted on-peak time value. In such a manner, energy management system 100 can avoid operating the appliance during times in which rates are likely to be on-peak.

As a further example, if utility company sends a signal to energy management system 100 every day at four p.m., energy management system 100, e.g., controller 108, can determine a predicted on-peak time value beginning at four p.m. for subsequent days. Thus, if a user attempts to start an appliance at half-past three p.m., energy management system 100 can delay execution of the appliance operation until after the predicted on-peak time value if the operation cannot be complete before the predicted on-peak time value. Alternatively, energy management system 100 can initiate appliance operations prior to the predicted on-peak time value such that the appliance operation is completed prior to the predicted on-peak time value. In such a manner, energy costs of the appliance can be reduced.

Figure 3:
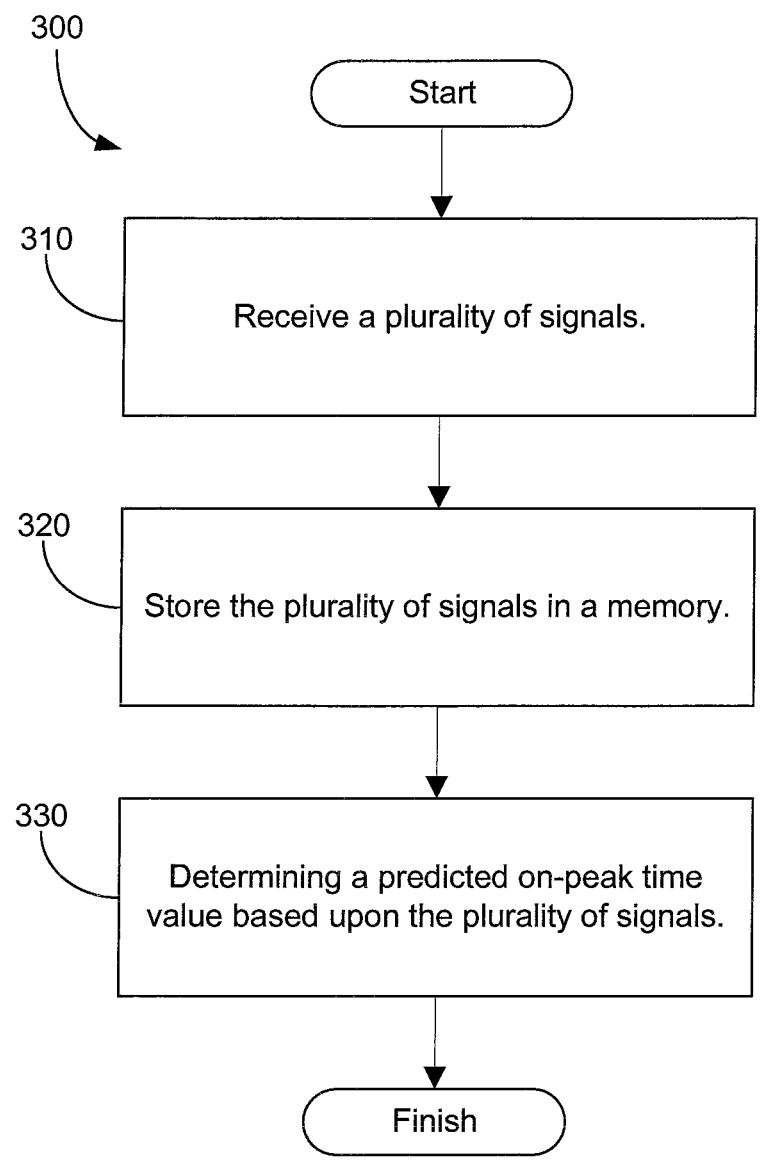
FIG. 3 illustrates a method for predicting an on-peak time value according to an exemplary embodiment of the present subject matter.

FIG. 3 illustrates a method 300 for predicting an on-peak time value according to an exemplary embodiment of the present subject matter. Energy management system 100, e.g., controller 108, (FIG. 1) may be configured or programmed to implement method 300. As discussed in greater detail below, utilizing method 300 can permit energy management system 100 to predict an on-peak time periods in order to permit energy management system 100 to avoid operating power consuming features/functions 104 during such time periods.

Steps 310-330 are substantially similar to steps 210-230 of method 200 (FIG. 2) described above. Thus, at step 330, energy management system 100, e.g., controller 108, determines a predicted on-peak time value based upon the plurality of signals. After step 330, the predicted on-peak time value can be presented to a user, e.g., on user interface 128, home computer 112, and/or a display of an appliance, e.g., one of appliances 102 (FIG. 1). The user of energy management system 100 can utilize the presented predicted on-peak time value to make decisions regarding when to execute appliance operations and/or any other electrical energy consumption decisions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for scheduling an appliance operation in order to reduce appliance energy consumption during on-peak time periods, the method comprising:
    receiving a plurality of signals, each signal of the plurality of signals having an on-peak time value;
    labeling each signal of the plurality of signals with at least one of a date and a time corresponding to when each signal of the plurality of signals was received during said step of receiving;
    storing the plurality of signals in a memory;
    determining a predicted on-peak time value based upon the plurality of signals with predictive analytics;
    establishing an operation to be performed by an appliance; and
    executing the operation of the appliance prior to or after the predicted on-peak time value, wherein a signal of the plurality of signals with an actual on-peak time value corresponding to the predicted on-peak team value is not stored with the memory prior to said step of executing.

2. The method of claim 1, wherein said step of receiving occurs over a period of time.

3. The method of claim 2, wherein the period of time is greater than one day, greater than one week, greater than one month, or greater than one year.

4. The method of claim 1, wherein said step of determining comprises averaging at least one of the dates and the times of the plurality of signals.

5. An energy management system for an appliance, comprising:
    a memory for storing a plurality of signals, each signal of the plurality of signals having an on-peak time value;
    a user interface panel configured for establishing an operation to be performed by the appliance; and
    a controller in communication with said memory and said user interface panel, said controller configured for
        determining a predicted on-peak time value based upon the plurality of signals;
        presenting the predicted on-peak time value on a display of the user interface panel;
        delaying the operation of the appliance during the predicted on-peak time value if a delay input is actuated at the user interface panel while the predicted on-peak time is presented on the display of the user interface panel; and
        executing the operation of the appliance during the predicted on-peak time value if an execution input is actuated at the user interface panel while the predicted on-peak time is presented on the display of the user interface panel, wherein a signal of the plurality of signals with an actual on-peak time value corresponding to the predicted on-peak time value is not stored with the memory prior to said step of executing.

6. The energy management system of claim 5, further comprising a signal source and means for communication that places said controller and said signal source in communication, wherein said controller is further configured for receiving the plurality of signals from said signal source and storing the plurality of signals within said memory.

7. The energy management system of claim 6, further comprising a time keeping mechanism configured for providing a date and a time, the time keeping mechanism being in communication with said controller, said controller further configured for labeling each signal of the plurality of signals with at least one of the date and the time corresponding to when each signal was received by said controller.

8. The energy management system of claim 7, wherein said controller is further configured for averaging the dates and the times of the plurality of signals in order to determine the predicted on-peak time value during step of determining.

9. The energy management system of claim 6, wherein said controller performs said step of receiving over a period of time.

10. The method of claim 9, wherein the period of time is greater than one day, greater than one week, greater than one month, or greater than one year.

11. A method for predicting an on-peak time value in order to reduce appliance energy consumption during on-peak time periods, the method comprising:
    receiving a plurality of signals, each signal of the plurality of signals having an on-peak time value;
    storing the plurality of signals in a memory;
    determining a predicted on-peak time value based upon the plurality of signals;
    presenting the predicted on-peak time value on a display of an appliance;
    delaying an operation of an appliance during the predicted on-peak time value if a delay input is actuated at a user interface panel of the appliance during said step of presenting; and
    executing the operation of the appliance during the predicted on-peak time value if an execution input is actuated at the user interface panel of the appliance said step of presenting, wherein a signal of the plurality of signals with an actual on-peak time value corresponding to the predicted on-peak time value is not stored with the memory prior to said step of executing.

12. The method of claim 11, wherein said step of receiving occurs over a period of time.

13. The method of claim 12, wherein the period of time is greater than one day, greater than one week, greater than one month, or greater than one year.

14. The method of claim 11, further comprising labeling each signal of the plurality of signals with at least one of a date and a time corresponding to when each signal of the plurality of signals was received during said step of receiving.

15. The method of claim 14, wherein said step of determining comprises averaging the dates and the times of the plurality of signals.

* * * * *